United States Patent
Kellokoski et al.

(10) Patent No.: US 10,956,080 B2
(45) Date of Patent: Mar. 23, 2021

(54) ERASURE OF DATA FROM A MEMORY OF A DATA STORAGE APPARATUS BY IDENTIFYING AVAILABLE FREE SPACE IN THE MEMORY AND ITERATIVELY WRITING A SEQUENCE OF FILES DECREASING SIZE TO THE MEMORY USING A FILE-BASED PROTOCOL

(71) Applicant: Blancco Technology Group IP Oy, Joensuu (FI)

(72) Inventors: Pasi Kellokoski, Joensuu (FI); Markus Törmä, Joensuu (FI); Pekka Nurminen, Joensuu (FI); Tomi Lehtola, Joensuu (FI); Petri Hentunen, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 7 days.

(21) Appl. No.: 16/334,344

(22) PCT Filed: Sep. 25, 2017

(86) PCT No.: PCT/EP2017/074250
§ 371 (c)(1),
(2) Date: Mar. 18, 2019

(87) PCT Pub. No.: WO2018/055171
PCT Pub. Date: Mar. 29, 2018

(65) Prior Publication Data
US 2019/0212942 A1 Jul. 11, 2019

(30) Foreign Application Priority Data
Sep. 23, 2016 (GB) .................................... 1616227

(51) Int. Cl.
*G06F 3/06* (2006.01)
*G06F 16/16* (2019.01)
(Continued)

(52) U.S. Cl.
CPC .......... *G06F 3/0652* (2013.01); *G06F 3/0604* (2013.01); *G06F 3/0623* (2013.01);
(Continued)

(58) Field of Classification Search
CPC .... G06F 3/0652; G06F 3/0623; G06F 16/162; G06F 3/0604; G06F 3/0643;
(Continued)

(56) References Cited

U.S. PATENT DOCUMENTS 10,120,579 B1 * 11/2018 Patiejunas ............. G06F 3/0676
2006/0021005 A1 1/2006 Williams et al.
(Continued)

FOREIGN PATENT DOCUMENTS

WO 2012167392 12/2012

OTHER PUBLICATIONS

International Report on Patentability dated Apr. 4, 2019 in PCT application No. PCT/EP2017/074250.
(Continued)

*Primary Examiner* — Hong C Kim
(74) *Attorney, Agent, or Firm* — Snell & Wilmer L.L.P.

(57) ABSTRACT

A method of erasing data using a file-based protocol from a data storage apparatus for repurposing, reallocation to a new user or retirement of the data storage apparatus, the data storage apparatus comprising a memory using a file-based protocol, and the method comprises: receiving one or more signals representative of the available free space of at least one selected region of the memory; iteratively writing files to the at least one selected region of the memory using the file based protocol, wherein: at least one of the files is sized
(Continued)

based on at least one of the received signals and the iterative writing of the files comprises writing the files in sequence such that for at least part of the sequence each file is smaller in size than the preceding file of the sequence; and wherein the files are written to collectively occupy all of the at least one selected region of the memory; and the method further comprises receiving an indication that said at least one selected region of memory is full following the writing of said files, and in response to the indication writing at least one further file to said at least one region of memory.

25 Claims, 4 Drawing Sheets

(51) Int. Cl.
G11B 5/024 (2006.01)
G11B 20/00 (2006.01)
(52) U.S. Cl.
CPC .......... *G06F 3/0643* (2013.01); *G06F 3/0659* (2013.01); *G06F 3/0673* (2013.01); *G06F 16/162* (2019.01); *G11B 20/00666* (2013.01); *G11B 5/0245* (2013.01)

(58) Field of Classification Search
CPC ................. G06F 3/0659; G06F 3/0673; G11B 20/00666; G11B 5/0245
USPC ............ 711/154, 103, 170; 726/26; 707/694
See application file for complete search history.

(56) References Cited

U.S. PATENT DOCUMENTS

2013/0305105 A1* 11/2013 Chuchem .............. G06F 11/263
714/719
2019/0095126 A1* 3/2019 Torma ................. G06F 3/04842

OTHER PUBLICATIONS

Darien Graham-Smith: "How to securely delete files", PC & Tech Authority, Oct. 18, 2011 (Oct. 18, 2011), XP055436752, Retrieved from the Internet <URL:https://www.pcauthority.com.au/tools/print.aspx?ciid=277119>.

* cited by examiner

Figure 3

| 731B | 73CB | 117C | C169 | 74EB |
|------|------|------|------|------|
| 6914 | 7171 | B174 | 5C17 | 0710 |
| 33B0 | 0000 | 1B7  | BC71 | C41B |
| 117C | 07BE | 997C | 7E1C | 565C |
| 3677 | 717C | 0710 | 6377 | 0101 |
| 773C | E310 | CC1C | C707 | 171C |
| 3333 | 6367 | 7194 | 1111 | 7731 |
| CC1C | 137B | E143 | 74C7 | 5615 |

204 → 202, 206, 200

ERASURE OF DATA FROM A MEMORY OF A DATA STORAGE APPARATUS BY IDENTIFYING AVAILABLE FREE SPACE IN THE MEMORY AND ITERATIVELY WRITING A SEQUENCE OF FILES DECREASING SIZE TO THE MEMORY USING A FILE-BASED PROTOCOL

CROSS-REFERENCE TO RELATED APPLICATIONS

This application is U.S. national phase filing under 35 U.S.C. § 371 of PCT/EP2017/074250 (the "250 application") filed on Sep. 25, 2017 and titled, "Data Erasure Method and Apparatus," now expired. The '250 application claims priority from the Great Britain Application No. 1616227.3 filed Sep. 23, 2016 and titled, "Data Erasure Method and Apparatus," now abandoned. Both of the aforementioned applications are incorporated herein by reference in their entirety for all purposes.

FIELD

This application relates to a method and apparatus for use in the erasure of data from a data storage apparatus.

BACKGROUND

It may be desirable to remove data such as sensitive data from a data storage apparatus when the data storage apparatus is to be repurposed, reallocated to a new user, or retired. The continued drive towards enhanced privacy and data protection legislation and the introduction of associated environmental regulations serves to emphasise the importance of the effective erasure of data from data storage apparatuses.

Billions of devices are in circulation that hold sensitive data, for example personal or company data. Privacy concerns arise when there is a failure to secure this data, which can lead to a difficult and a legally uncertain situation when retiring or disposing of data bearing assets. As a result, security measures are required to mitigate potential threats and reduce the likelihood of a data breach. Prior to repurposing and/or retiring a device, stored data should be securely and efficiently erased. Indeed data protection legislation, national data security guidelines and environmental regulations support this notion.

In some case, industrial processing plants, referred to as IT Asset Disposition (ITAD) services, are used to facilitate the redeployment of devices, often processing tens of thousands devices a week. In these situations the speed at which devices can be processed is paramount to the return on investment from the recycling facility as the value of a device can decline over time and the resource costs required during the handling process increase. The secure redeployment of devices is a key part of this industry and ensuring that user data has been removed is a key part of the disposition process.

Turning to mobile technologies, for example smart phones and tablets, the foremost way to erase data and prepare it for redeployment or retirement is to access the 'factory reset' option via the operating system installed on the device. For the specific example of a device running iOS an 'Erase All Contents and Settings' function can be selected from an appropriate menu. Likewise, a similar procedure is provided on other phone platforms i.e. Android, Windows and Blackberry.

It is known that, in many cases, a functional operating system should be retained when re-conditioning a device. If the operating system is removed during data erasure, the device must, in some cases, be re-flashed with an operating system, adding to time needed to process the device. The manufacturer's warranty is also likely to be voided and a device that appears to be rooted may be prevented from being re-sold. Therefore any data removal procedure for the purpose of re-conditioning a device may be constrained by restrictions imposed by the operating system. Therefore, in many cases, internal data erasure processes of the operating system must be used. This means that, for example, no direct access may be available to the memory and access may only be granted via the installed operating system.

Individual users typically use in-built factory reset processes of the installed operating system to erase all of the user data, including application data, stored files and user credentials. Factory reset processes for developers of devices such as smart phones is not standardised by any technology consortium or officially agreed upon within industry. For example, Android operating system offer guidelines on these processes but phone developers are not necessarily bound to these guidelines. These guidelines do not offer any insights into the underlying processes undertaken by a phone when factory reset is selected. Some may perform adequate data erasure, others may report success but do very little to actually remove the data physically stored on the memory chip inside the phone (i.e. the eMMC package). It is therefore difficult for a user to reliably know how effective the factory reset process is. On the other hand, iOS offers a user more information about their security process. However, it follows that the same or similar problems exist for other mobile platforms and technologies.

Known factory reset processes include utilizing cryptographic techniques, whereby the cryptographic key that is used to encrypt user data (and is therefore required to decrypt the user data) is erased, hence rendering the data cryptographically inaccessible. Such techniques involve encryption built into the hardware of a device, and therefore, once activated, all stored data is encrypted by default. This process, applied to all stored data, is generally irreversible.

Cryptographic approaches applied to storage devices come with several problems. For example, recently it has been reported that brute force attacks have been successful on Android devices with full disk encryption. In general, cryptographic techniques may be circumvented or eventually broken in the future through, for example, unforeseen developments in technology. Coupled with continuous methodological attempts to break them by researchers and hackers this creates an uncertainty in their security. There are historical examples of cryptographic systems being broken. From the point of view of a user, encrypting the data of a device may have adverse effects on the performance of the device. It may be hard for a user to determine the quality of the encryption applied i.e. how secure the data is. Furthermore, from a user's perspective, it may be difficult to determine if data encryption has been turned on since the beginning of the device's usage. In addition, cryptographic approaches rely on a device completely and effectively destroying previous encryption keys. Data is not actively removed or overwritten by the process. Therefore, an error in destroying the keys provides a potential security breach, as data is recoverable.

Other known factory reset processes implemented by original equipment manufacturers include logically deleting data through making stored data on a storage device invalid without actually physically removing it from the storage device. Another process is issuing firmware commands to empty the contents of a user data partition of the memory device. However, when removing a file, an operating system typically only deletes the name of the file from an associated table and does not delete its content. Crucially, a user is not aware of the details and has little control over the factory reset process.

Another known process for erasing data on a storage device is to overwrite the stored data with redundant content. Typically, data on the storage device is accessed using the transfer protocol associated with the interface. In the case of addressing a mobile device, the transfer protocol is designed for transferring media or other files to the device. An outstanding problem with this process is that incomplete overwriting provides a security risk.

In summary, amongst other things, there is a need to provide a reliable and preferably platform-independent process for erasing data on storage devices on a large scale to mitigate issues arising from a reliance on factory reset processes.

SUMMARY

In a first aspect of the invention there is provided a method of automatically erasing data from a data storage apparatus comprising a memory using a file-based protocol, the method comprising: receiving one or more signals representative of the available free space of at least one selected region of the memory; iteratively writing files to the at least one selected region of the memory using the file based protocol, wherein at least one of the files is sized based on at least one of the received signals, and wherein the files are written to collectively occupy all of the at least one region of the memory.

In a further aspect, which may be provided independently, there is provided a method of erasing data using a file-based protocol from a data storage apparatus for repurposing, reallocation to a new user or retirement of the data storage apparatus, the data storage apparatus comprising a memory, and the method comprising: receiving one or more signals representative of the available free space of at least one selected region of the memory; iteratively writing files to the at least one selected region of the memory using the file based protocol, wherein at least one of the files is sized based on at least one of the received signals and the iterative writing of the files comprises writing the files in sequence such that for at least part of the sequence each file is smaller in size than the preceding file of the sequence; the files are written to collectively occupy all of the at least one selected region of the memory. Optionally, the method further comprises receiving an indication that said at least one selected region of memory is full following the writing of said files, and in response to the indication writing at least one further file to said at least one region of memory.

The selected at least one region may comprise the user partition of the memory and/or substantially all of the memory not reserved for an operating system and/or firmware of the apparatus. The method may comprise connecting the data storage apparatus (e.g. via wired or wireless connection) to a data erasure apparatus and using the data erasure apparatus to perform the method, for example to write the files to the memory of the data storage apparatus. The data erasure apparatus may comprise, form part of or be connected to an operator terminal, for example an operator terminal of an IT asset disposition facility.

The writing of at least one further file in response to the indication may comprise writing a plurality of further files in response to the indication, at least some of which have selected different sizes. The method may comprise freeing at least some of the region to allow the writing of the at least one further file. The at least one further file may be of a size selected to flush out at least one buffer or cache associated with the data storage device and/or the memory. The at least one further file may be of a size selected in dependence on a size of at least one buffer or cache associated with the device and/or the memory. The indication may be any suitable indication that may be representative of or associated with the at least one selected region being full.

The method may further comprise performing a verification procedure. The verification procedure may comprise reading data from at least one portion of the selected region of memory, using a stored index or indices to select at least one sub-set of a data set used for generation of the files written to the memory, said at least one sub-set corresponding to said at least one portion. The verification procedure may further comprise comparing the read data with the corresponding at least one sub-set of data.

The data used for generation of the files written to the memory may be generated using a seed. The verification procedure may comprise regenerating at least part of the data set using the seed.

The verification procedure may comprise using said stored indices and said seed to regenerate the sub-sets of the data-set, or to regenerate selected ones or parts of the sub-sets, optionally without generating the whole of the data set used for generation of the files written to memory.

At least some, optionally each, of the files may comprise randomly generated data.

The sizing of the file may comprise selecting the size of the file. The occupying of the at least one region of memory may comprise over-writing the at least one region of memory.

Iteratively writing the files may further comprise reducing in size one or more of the iteratively written files based on the received one or more signals. Reducing in size the one or more files may comprise writing successively smaller files.

The method may comprise writing the files in sequence, and for at least part of the sequence each file of said at least part of the sequence may be smaller in size than the preceding file of the sequence. Said at least part of the sequence may comprise a final part of the sequence.

The method may comprise reducing in size said one or more of the files until the received signal indicates that the at least one selected region of memory is full.

The file size may be selected to be such as to ensure overwriting of file system buffer(s).

The one or more signals may comprise at least one file. The one or more signals may be generated in response to a request for available free space, and each of the received signals comprise a respective value representative of an amount of available free space. The request for available free space may be made after a file is written.

The signals may be generated and/or requested using the file-based protocol and/or using an operating system of the apparatus. The received signals may further comprise an interrupt signal sent from the data storage apparatus.

The method may comprise performing an initial erasure and/or freeing procedure to erase data from the selected at least one region of memory and/or to free up the selected at least one region to receive files, prior to the iterative writing of the files.

The selected at least one region of memory may comprises a user storage region, for example a user partition.

The selected at least one region may comprise region(s) of the memory to which a user of the data storage apparatus may, for example has permissions to, write user-specified content, for example data, programs, images, documents. The selected at least one region may comprise substantially all region(s) of the memory to which a user may, for example has permissions to, write user-specified content, for example data, programs, images, documents. The selected at least one region may comprise memory that is not reserved for an operating system and/or firmware of the data storage apparatus. The selected at least one region may comprise substantially all of the memory which is not reserved for an operating system and/or firmware of the apparatus. The selected at least one region may comprise one or more, optionally all, regions whose stored content may change due to use of the device by a user.

The method may comprise generating the files.

The generating of the files may comprise selecting a plurality of sub-sets of a data set and, for each of the files, generating the file to comprise a selected one of the plurality of sub-sets.

At least some of the sub-sets may be different to at least some other of the sub-sets. Each of the sub-sets may be different to each of the other sub-sets. Each of the sub-sets may comprise contiguous or overlapping parts of the data set, or may comprise separated parts of the data set. At least some of the sub-sets may be a different size to at least some of the other sub-sets.

The method may comprise storing indices, for example pointers, representative of the parts of the data set of which the sub-sets consist.

At least some, optionally each, of the files may comprise randomly generated data.

The data set may comprise a randomly generated data set and the sub-sets may comprise selected parts of the randomly generated data set.

The method may comprise generating a random dataset. The iteratively written files may comprise subsets of data of the generated random dataset.

The method may comprise generating the data set and/or the files using at least one seed, and storing the at least one seed.

The method may comprise regenerating the data set and/or the files using the at least one seed, for example for verification purposes.

The iteratively written files may be reproducible using a seed and a stored index or stored indices. The method may comprise reproducing at least some, optionally all, of a selected one or more of the files, using the seed and the stored index or stored indices.

The method may comprise performing a verification procedure to verify that the files have been written to the memory correctly and/or to verify that substantially all of the selected at least one region of memory has been occupied.

The verification procedure may comprise:
reading data from a portion of the selected region of memory,
comparing the read data with data that was included in the files written to the memory.

The method may further comprise retrieving or regenerating the data that was included in the files written to the memory.

The method may further comprise retrieving or regenerating the data using the indices and/or the at least one seed.

The method may further comprise receiving an indication that said at least one region of memory is full, following the writing of said files, and in response to the indication freeing up at least some of said at least one region of memory and writing at least one further file to said at least one region of memory. The freeing up may comprise deleting at least one of the files and/or deleting data included in at least one of the files, optionally using the file-based protocol.

The freeing up and the writing of the further files may be repeated more than once. For at least some of the repetitions, optionally each of the repetitions, the sizes and or contents of the further files may be different and/or different parts of the memory may be freed up.

The data storage apparatus may comprise at least one of a phone, a smartphone, a tablet, a laptop computer, a desktop computer, a portable electronic device, a music device and/or a video device.

The data storage apparatus may comprise any suitable device, for example an iOS device or an Android device or a Windows device or a Blackberry device.

The memory may comprise any suitable memory, for example but not limited to at least one of a Self-encrypting Drive (SED), a Hard Disk Drive (HDD), a Solid State Drive (SSD), Non-Volatile Memory, flash memory, NAND flash memory, Random Access Memory (RAM), 3D Cross Point, ReRam, Phase Change Memory.

The method may comprise providing the files to the apparatus and/or the memory via an interface, and the interface may operate according to, or may be compliant with, any suitable interface protocol or standard, for example at least one of Serial AT Attachment (SATA), Parallel ATA (PATA), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe), Universal Flash Storage (UFS), Multi-MediaCard (MMC) and MMC variants including RS-MMC, MD-MMC, DV-MMC, MMCplus, MMCmobile, SecureMMC, eMMC, and Secure Digital and Secure Digital variants including SDIO, SD, miniSD, microSD.

Each of the files may be of size between a maximum file size and a minimum file size.

The maximum file size may be in a range between 1 MB and 100 MB, optionally between 5 MB and 20 MB, optionally substantially equal to 10 MB.

The minimum file size may be less than 100 bytes, optionally less than 10 bytes, optionally 3 bytes, 2 bytes or 1 byte.

The method may comprise selecting the maximum file size and/or the minimum file size in dependence on at least one of the nature or identity of the apparatus and/or the memory, and/or the nature or identity of an operating system of the apparatus and/or the memory, and/or the size of the memory or the selected at least one region of the memory.

In a further aspect, which may be provided independently, there is provided a system for erasing data from a data storage apparatus comprising a memory using a file-based protocol, the system comprising:
the data storage apparatus; and
a data erasure apparatus comprising a processing resource configured to:
receive one or more signals representative of the available free space of at least one selected region of the memory;
iteratively write files to the at least one selected region of the memory using the file based protocol, wherein at least one of the files is sized based on at least one of the received signals, and wherein the files are written to collectively occupy all of the at least one region of the memory.

In another aspect, which may be provided independently, there is provided a data erasure apparatus configured to erase data from a data storage apparatus comprising a memory using a file-based protocol, the data erasure apparatus comprising a processing resource configured to:
receive one or more signals representative of the available free space of at least one selected region of the memory;
iteratively write files to the at least one selected region of the memory using the file based protocol, wherein at least one of the files is sized based on at least one of the received signals, and wherein the files are written to collectively occupy all of the at least one region of the memory.

In another aspect, which may be provided independently, there is provided a system for erasing data from a data storage apparatus comprising a memory using a file-based protocol, the system comprising:

the data storage apparatus; and
a data erasure apparatus comprising a processing resource configured to:
receive one or more signals representative of the available free space of at least one selected region of the memory;
iteratively write files to the at least one selected region of the memory using the file based protocol, wherein
at least one of the files is sized based on at least one of the received signals and the iterative writing of the files comprises writing the files in sequence such that for at least part of the sequence each file is smaller in size than the preceding file of the sequence;
the files are written to collectively occupy all of the at least one selected region of the memory; and
the method further comprises receiving an indication that said at least one selected region of memory is full following the writing of said files, and in response to the indication writing at least one further file to said at least one region of memory.

In a further aspect, which may be provided independently, there is provided a data erasure apparatus configured to erase data from a data storage apparatus comprising a memory using a file-based protocol, the data erasure apparatus comprising a processing resource configured to:
receive one or more signals representative of the available free space of at least one selected region of the memory;
iteratively write files to the at least one selected region of the memory using the file based protocol, wherein:
at least one of the files is sized based on at least one of the received signals and the iterative writing of the files comprises writing the files in sequence such that for at least part of the sequence each file is smaller in size than the preceding file of the sequence;
the files are written to collectively occupy all of the at least one selected region of the memory; and
the method further comprises receiving an indication that said at least one selected region of memory is full following the writing of said files, and in response to the indication writing at least one further file to said at least one region of memory.

In another aspect, there is provided a computer program product comprising computer-readable instructions that are executable to perform a method as claimed or described herein.

Features in one aspect may be applied as features in another aspect in any appropriate combination. For example, system or apparatus features may be applied as method features and vice versa.

BRIEF DESCRIPTION OF THE DRAWINGS

Various aspects of the invention will now be described by way of example only, and with reference to the accompanying drawings, of which:

FIG. 3 illustrates data stored within a plurality of memory addresses of a memory.

DETAILED DESCRIPTION OF THE DRAWINGS

Certain embodiments relate to a method of overwriting storage of a device that may support access to a file-based transfer protocol to maximise potential for all available space to be overwritten. An operating system is maintained on the device after the erasure according to some embodiments.

Figure 1A:
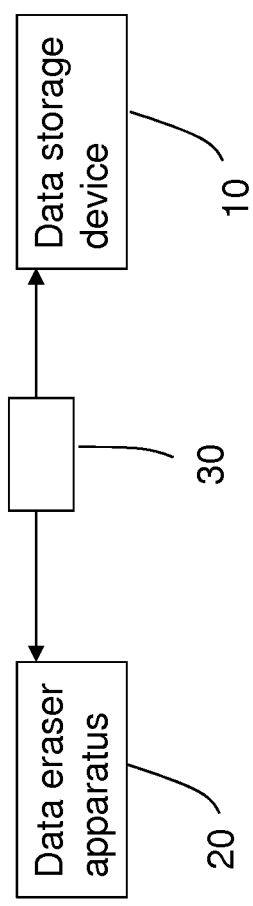
FIG. 1A is a schematic diagram of a data erasure apparatus in communication with a data storage device.

Referring initially to FIG. 1A, there is shown a data storage device 10 and a data erasure apparatus 20. The data storage device 10 and the data erasure apparatus 20 are configured for the transfer of data therebetween via an interface 30 in accordance with a file-based transfer protocol. The data storage device may be, for example, a mobile smartphone or a tablet, or any other suitable data storage device. The file-based transfer protocol operates at a logical file level and may be, for example, a media transfer protocol (MTP), a picture transfer protocol (PTP), Apple File Conduit (AFC) and USB mass storage. The file-based transfer protocol that is used is dependent on the particular data storage device 10 or type of data storage device.

Figure 1B:
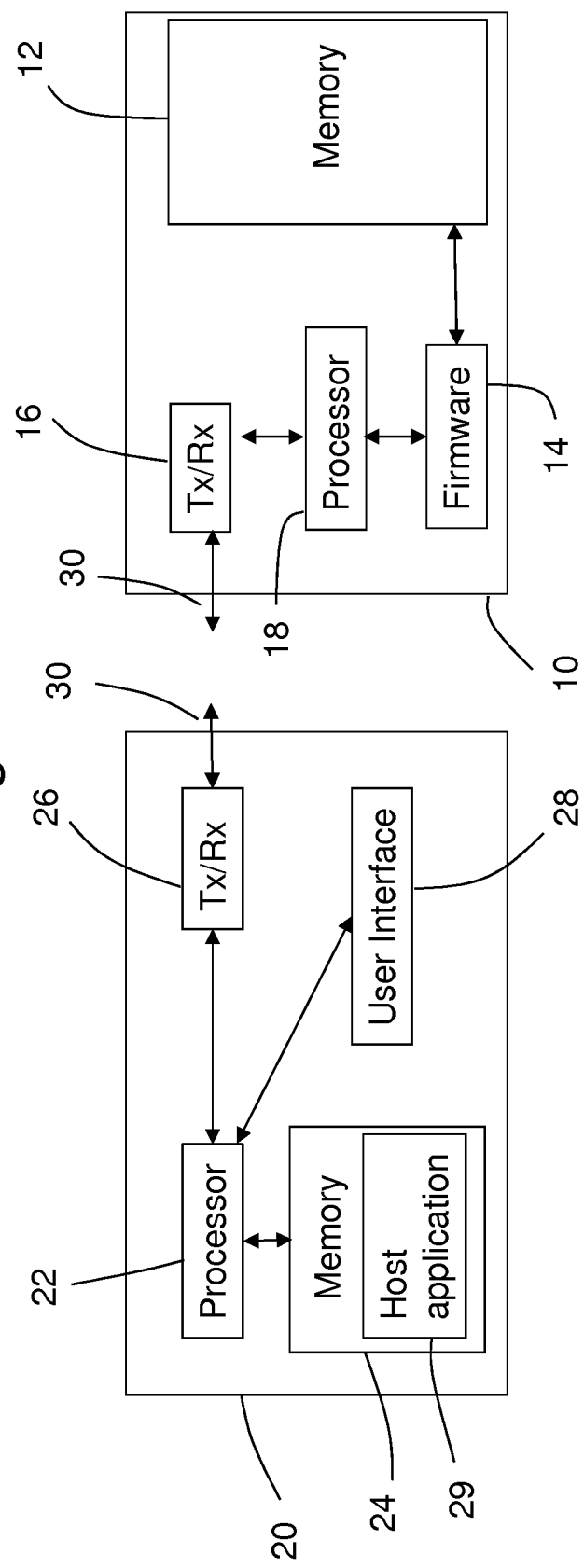
FIG. 1B is a schematic diagram of the data erasure apparatus in communication with the data storage device.

The data storage device 10 and data erasure apparatus 20 is shown in more detail in FIG. 1B. Whilst the data erasure apparatus 20 is represented as a single apparatus in FIGS. 1A and 1B, it should be understood that the data erasure apparatus 20 may, in reality, include a plurality of distributed separate devices which may collectively perform the function of the data erasure apparatus 20 as described below. Also, the data erasure apparatus 20 may be located adjacent to the data storage device 10 or may be located remotely from the data storage device 10.

As shown in FIG. 1B, the data storage device 10 includes memory 12 for data storage, software, for example firmware 14, for performing data storage and data erasure operations, a transmitter/receiver 16 for communicating with the data erasure apparatus 20 via the interface 30 and a processor 18. Although not shown in FIG. 1B, it should be understood that the data storage device 10 may include data compression functionality for compressing data to be written to the memory 12 or for decompressing data read from the memory 12. Similarly, although not shown in FIG. 1B, it should be understood that the data storage device 10 may include wear-levelling functionality for distributing data to different physical memory addresses at different times to thereby extend the lifetime of the memory 12. The memory 12 of the data storage device 10 may include or may be at least one of a Self-encrypting Drive (SED), a Hard Disk Drive (HDD), a Solid State Drive (SSD), Non-Volatile Memory, flash memory, NAND flash memory and Random Access Memory (RAM).

The interface 30 may operate according to, or may be compliant with, an interface standard, for example at least one of Serial AT Attachment (SATA), Parallel ATA (PATA), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe), Universal Flash Storage (UFS), MultiMediaCard (MMC) and MMC variants including RS-MMC, MD-MMC, DV-MMC, MMCplus, MMCmobile, SecureMMC, eMMC, and Secure Digital and Secure Digital variants including SDIO, SD, miniSD, microSD.

As shown in more detail in FIG. 1B, the data erasure apparatus 20 includes a processor 22, a memory 24, a transmitter/receiver 26 and a user interface 28. The data erasure apparatus 20 may include or may be at least one of a server, a computer, and a laptop. A host application 29 comprising computer-executable instructions is stored in the memory 24 which, when executed by the processor 22, cause the data erasure apparatus 20 to perform the data erasure method 100 illustrated in FIG. 2.

Alternatively, the host application computer-executable instructions 29 may be transferred to the data storage device 10 via the interface 30 and stored on the memory 12 of the data storage device 10. In this case, the processor 18 can run the computer-executable instruction 29 on the data storage device 10. Advantageously, the volume of data transferred between the data erasure apparatus 20 and the data storage device 10 over the interface 30 and the bandwidth required is reduced and/or minimized. This is of particular importance when processing more than one data storage device connected to the same data erasure apparatus 20. For example, this approach may be suited to a data storage device running the Android operating system. On completion of the erasure process, the application can be removed, for example, using a platform package manager. In the Android operating system, the application can be removed via Android Debug Bridge (adb) using the command 'packetmanager clear'.

As a further alternative the file handling may be performed by both the data erasure apparatus 20 and an application installed on the data storage device 10.

Figure 2:
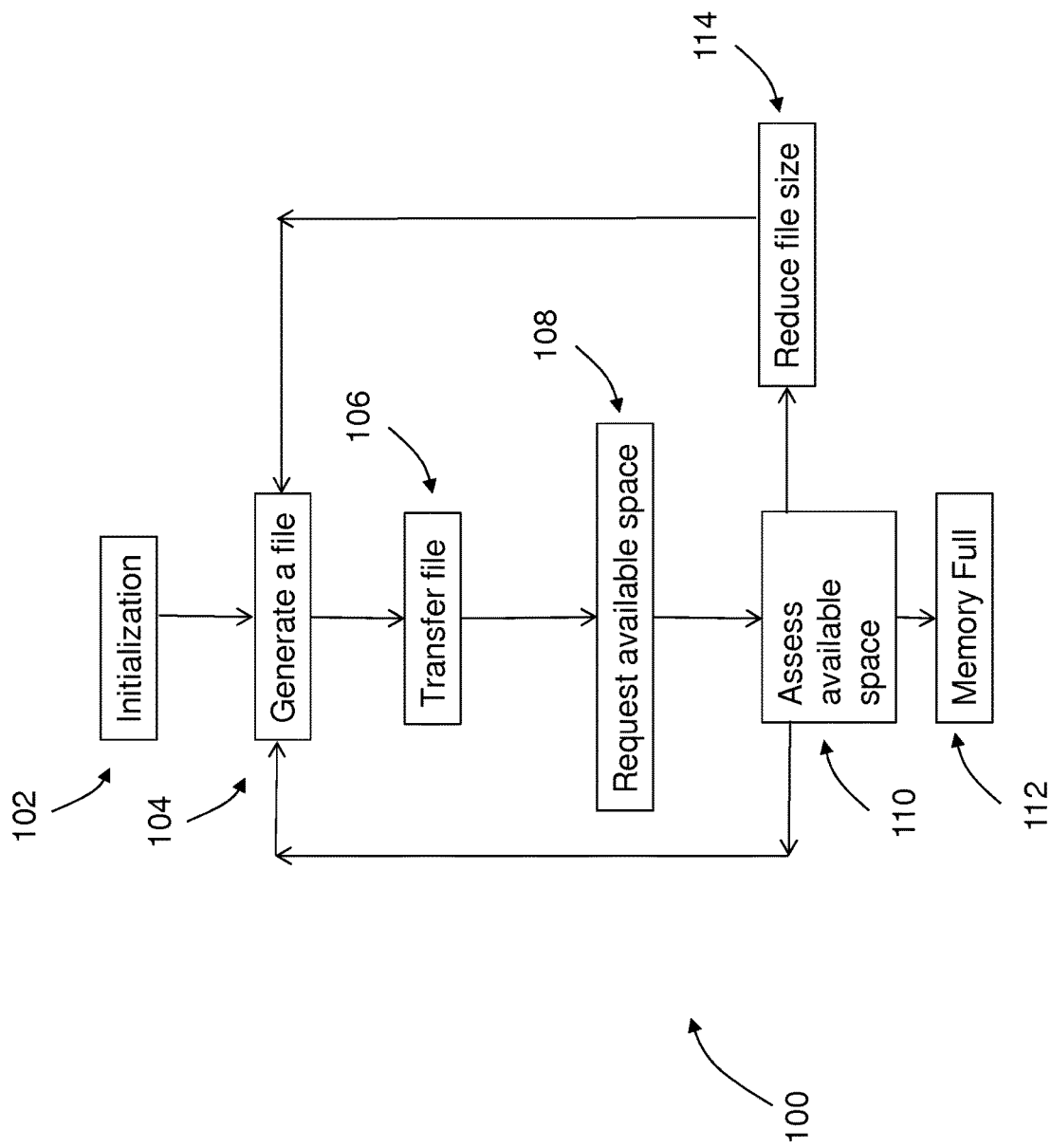
FIG. 2 is a flow chart of a data erasure method.

The method of FIG. 2 is described with reference to the first approach of the host application on the data erasure apparatus. However, it should be clear that an approach involving the host application on the data storage device 10 could be similarly implemented.

FIG. 2 shows a flowchart illustrating in overview an automatic data erasure method 100. The method 100 is iterative. An initial erasure is first performed, or has already been performed, to free all possible memory. In Win Phone and iOS this is with factory reset/re-flash, alternatively Android clears all applications, packages and user accounts. Step 102 is an initialization step that is then performed. This step involves a procedure whereby the data storage device 10 and the data erasure apparatus 20 can transfer initial information, for example system configuration information. System configuration information is transferred from the data storage device 10 to the data erasure apparatus 20 over the interface 30. Information transferred may include details on the operating system running on the data storage device 10. In addition, a total size of memory 12 may be sent to the data erasure apparatus. At this stage, a request can be made for size of available space on memory 12.

At step 104 the host application, creates a file to be transferred. The file is created and populated with randomised data. To create a random data file any random number generator may be used. Preferably, a deterministic random number generator can be used, for example a pseudo random number generator (PRNG). In this case, at least one seed is given to the random number generator to generate the file. In an implementation in Qt, the Qt function Qrand can be used. In addition, the file has no special structure or associated metadata. The host application uses a file-handle to track and identify individual files using a unique handle filename and information about the file size. Any other suitable random number generation process and/or file handling process may be used in alternative embodiments.

Alternatively, the file may be created by selecting a subset of data from a larger dataset stored in the memory 24 of the data erasure apparatus 20. For example, a transfer buffer filled with random data that is larger than the size of the file to be created is created in memory 24 of the data erasure apparatus 20 during the initialization step 102. Step 104 comprises of selecting a sub-section of the transfer buffer and creating a file using the selected sub-section. The file is created by copying a subsection of the file buffer as described later.

As described in more detail later, step 104 may include the optional steps of recording a reference index for each created file. The reference index represents a location in the transfer buffer that identifies the created file. The reference index indicates the position in the transfer buffer from which the file was created. The reference index therefore acts as a pointer. The reference index may be an offset of an address of the transfer buffer. For example, the reference index may correspond to a start point of the selected sub-section copied to the created file. However, the reference index can point to any part of the file. Step 104 may also include storing one or more reference indices for the generated files for later re-production of the created file.

The created files have a size set to a transfer file size value. The transfer file size value is initially equal to an initial file size value. The initial file size value can be any value and is dependent on the device being erased. The initial file size value can be determined in a number of ways. For example, a user may set the initial file size value via the user interface 28. Alternatively, the initial file size value may be set depending on which of one or more different types of data storage device is being processed and/or depending on which operating system(s) is running on the device. For example, for a phone running iOS may have a different initial file size value to a phone running Android. This information can be stored in, for example, a look-up table. As method 100 proceeds, the transfer file size value is varied.

Different initial file size values were tested. For a Windows device and iOS devices, the initial file size is 10 MB. In this context a MB is 2^20 bytes. Following tests, this initial file size value was found to provide the fastest erasure process; smaller files lead to a longer process and larger files do not improve the speed. For Android devices, the initial file size is selected as 100 MB.

The next step of process 100 is step 106 which involves transferring the created file to the data storage device 10. The files are transferred from the data erasure apparatus 20, using the file-transfer protocol, over the interface 30. This step includes the data storage device 10 receiving the file and the processor 18 writing the file to the memory 12 via the firmware 14. The transfer protocol may transfer additional information together with the file. For example, at least one header and/or footer and/or additional metadata is transferred. This additional information is only used during the transfer and is not written to memory.

Following a file transfer, a request 108 is made by the host application for available space on the memory 12. The request comprises a signal sent over the interface 30 from the data erasure apparatus 20 to the data storage device 10. The processor 18, via the firmware 14, checks the available space on the memory 12. A response signal is sent from the data storage device 10 to the host application 29 containing a value indicative of the amount of free space available in the memory 12. The response signal is received by the data erasure apparatus 20.

The amount of free space available is calculated using the cumulative size of data written during the erasure process and the total accessible space at the start of the process. It is possible that the precision of this calculation is limited by a minimum size resolution resulting from specific implementation of the device and protocol used.

Optionally, requests may be sent only after a trigger event, for example if a threshold, for instance a pre-set threshold, is reached or a signal is received from the data storage device 10. As an example, a threshold may be set using the total memory and free memory values exchanged in the initialization step 102. Hence, when the total size of all files transferred reaches or is larger than the threshold, the data erasure apparatus 20 may start to request an available space value, at step 108. Advantageously, this limits the request step occurring only when the total size of all files transferred approaches the size of the memory 12. Alternatively, the trigger event may be a signal sent from the data storage device 10 informing the data erasure apparatus 20 that the available space is becoming low.

In some embodiments, a query for the amount of remaining free space is sent after each and every write operation.

Following the request step 108, a processing step 110 is performed by the processor 22 of the data erasure apparatus 20. The processing step includes updating a total size transferred value. The processing step also includes processing the available space signal. Processing the available space signal involves extracting the available space value and comparing the available space value with the total size of files already transferred to give an indication of whether the memory is full or not full. The processing step 110 also includes comparing the current file transfer size to the available space on the memory 12 to give an indication if there is sufficient space for a further file with current file transfer size to be transferred. The step of comparing the current file transfer size to the available space on the memory 12 may only take place if the memory is not full.

There are three possible outcomes of the processing step 110 depending on the comparison result.

The first outcome results if the memory is full, in which case the method 100 proceeds to step 112.

The second outcome results if the memory is not full and there is sufficient space for a further file with the current file transfer size to be transferred. In this case, the method returns to step 104 to generate a new file with a size equal to the current file transfer size. The method 100 then proceeds iteratively.

The third outcome results if the memory is not full and there is not sufficient space for a further file with the current file transfer size to be transferred, then the file transfer size value is updated to a smaller file transfer size value. In this case, the method returns to step 104 to generate a reduced file with a size equal to the new file transfer size.

In some embodiments, when the available free space value returned by the device is smaller than the current file transfer size value, the transfer size value is set to be equal to the available free space value returned by the device. Subsequent to transferring a file of this size, the file transfer size value is updated to a smaller file transfer size value. In some embodiments, the number of iteratively smaller files required to fill the available space following a transfer of a file with a size equal to the available free space may be about 20.

In some embodiments, due to slow response times of a device becoming full, the request for available space may, on occasion, time out. A time out can be registered by the apparatus. In the event of a time out, a further file of the same file transfer size or of a smaller file transfer size may be sent by the apparatus followed by a further request for available space. Following a time out, behaviour may be unreliable. In some embodiments, a fail-safe mode may be implemented to reset the device and/or restart the erasure process, at least in part, following a time out.

While the processor step 110 is described as occurring only on the processor 22 of the data erasure apparatus, alternative implementations are possible. For example, comparing the current file transfer size to the available space on the memory 12 may occur on the processor 18 of the data storage device.

Alternatively, the indication that there is not sufficient space for a further file with current file transfer size to be transferred may be in the form of an interrupt signal sent from the data storage device 10 to the data erasure apparatus 20. The interrupt signal is thrown by the host application. The interrupt signal may be sent after an attempt to write the file is made i.e. after step 106 and before step 108. In this case, the interrupt signal is received and processed as part of the processing step 110. One example of such an interrupt is that of a device running the Android operating system and using a media transfer protocol sending an interrupt signal to the data erasure apparatus through a separate USB channel.

The method 100 is iterative. As a virtue of the file-based transfer protocol subsequently written files do not overlap. The iterative method 100 fills all the available memory space.

In contrast to writing one file to memory, iteratively writing files can offer the advantage of reducing the number of bytes transferred and forces the journaling filesystem to write over its own allocated buffers. Furthermore, by writing multiple files overprovisioning can be more effective.

The final iteration may involve transferring a file of a minimum file transfer size. The minimum transfer file size may be equal to a single byte or any other suitable minimum size. When a file of this size cannot be transferred to the memory 12, the method proceeds to step 112. The iterative method 100 may ensure that the entire addressable space of the memory 12 is over-written and therefore that all of the previous contents of the memory 12 is inaccessible and hence erased.

The data storage device 10 may initially report that it has zero available space either via the requested signal or the interrupt signal yet it may still in practice accept some data. This could occur in the situation that the calculation of available space is limited by a resolution of the device. As a simple example, the device may have 511 bytes left but have a block size of 512 bytes. Depending on the device and protocol implemented the signal from the device may state that 0 bytes are free in this situation. Therefore, in this situation, the signal will reflect no available space even though 511 bytes are free. Therefore, in some embodiments, the method may not stop after the first rejection and further file writing operations may be performed even if it is indicated that the memory is full. Tests have shown that some devices that report they are full continue to accept more data.

An additional optional step (not shown) of method 100 occurs after step 112. In this step a portion of memory 12 is marked to be re-written to using the method 100. This portion can be a set size, for example 100 MB. The portion may be freed by deleting one or more files using the file-transfer protocol and the file writing process starts over again.

Re-writing to portions of memory can reduce the risk that some files are not completely written to memory and instead are retained in the transfer buffer or other buffer(s) or cache(s). For example, an interrupt signal may prevent a file from being written fully to the memory when in fact space was available. This presents a security risk as not all data in the memory is written over and hence some data may be recoverable. Also, an overprovisioned area may exist that is not directly accessible to the host application. Also, there is a risk that the filesystem in the device only allows one file per block (for example only one file for every 512 bytes). By repeating the process 100 these risks may be reduced. Continuing to write data in this way may rotate memory space areas into use, or at least encourage this behaviour. The process 100 can be repeated multiple times for different marked portions of data. This will ensure that as much data is written to the memory 12 as possible and that any caches are flushed to the device. For example, freeing and re-writing can be repeated a set number of times or the number of repetitions can be calculated such that a certain proportion (for example, 25%) of the total storage is re-written.

Transferring files over a file-transfer protocol may result in unexpected behaviour depending on the nature of the device and/or the file transfer protocol and/or any faults in the memory or device. Therefore, additional steps may be needed to ensure that the data being sent over the interface is actually being written to the memory 12.

Such additional verification steps may be added to process 100. In some embodiments, the verification may be based on creation of a set of unique files to be transferred. Uniqueness of transferred files provides permits verification of transferred files. One approach to create unique files is to ensure that the transfer buffer created in the memory 24 that is used to create random files is of a sufficiently large size to create a sufficient number of unique files to fill the memory 12. The size of the transfer buffer is dependent on the size of the target memory. For example, the size of the large transfer file may be set to be equal to the size of initial transfer file size added to the size of the memory 12 divided by the initial transfer file size. For the example above, the initial transfer file size is 10 MB. This ensures that every file created from the file buffer and written to memory is different to the previously created and written file from the point of view of the device. The file buffer is then sufficiently large to create a unique set of files to completely fill the memory 12.

An illustration of a section of transfer buffer file 200 is shown populated with random data. An example of a created file 202 with a file size is outlined. The created file 202 contains a selection of a sub-section of the transfer buffer file 200. The content of the created file 202 has a start point 204 and an end point 206. The content of the created file has a size between the start point 204 and end point 206.

Selected sub-sections for the created files can have periodic boundaries. If the end of the transfer buffer is reached before a file is completely created then step 104 starts to take data from the beginning of the transfer buffer. In other words, if a byte of the selected sub-section that is not the end-point 206 coincides with the last byte of the transfer buffer then the next byte used for the created file coincides with the first byte of the transfer buffer. As an illustrative example, a large buffer sized at 12 bytes is represented as [ABCDEFGHIJKL]. If the file transfer size is 5 bytes then there are 12 possible unique single files that can be created corresponding to: [ABCDE], [BCDEF], [CDEFG], [DEFGH], [EFGHI], [FGHIJ], [GHIJK], [HIJKL], [IJKLA], [JKLAB], [KLABC] and [LABCD]. The illustrative example has increments of one byte. Advantageously, the increments are a small prime number to prevent identification of files that contain similar data by the data storage device 10.

Returning to FIG. 3, the start point 204 indicates the reference index for the file 202. The reference index 204 allows the file to be reproduced from the transfer buffer. Storing the reference indices of all transferred files allows all the transferred to be re-produced from the transfer buffer at a later time.

Figure 4:
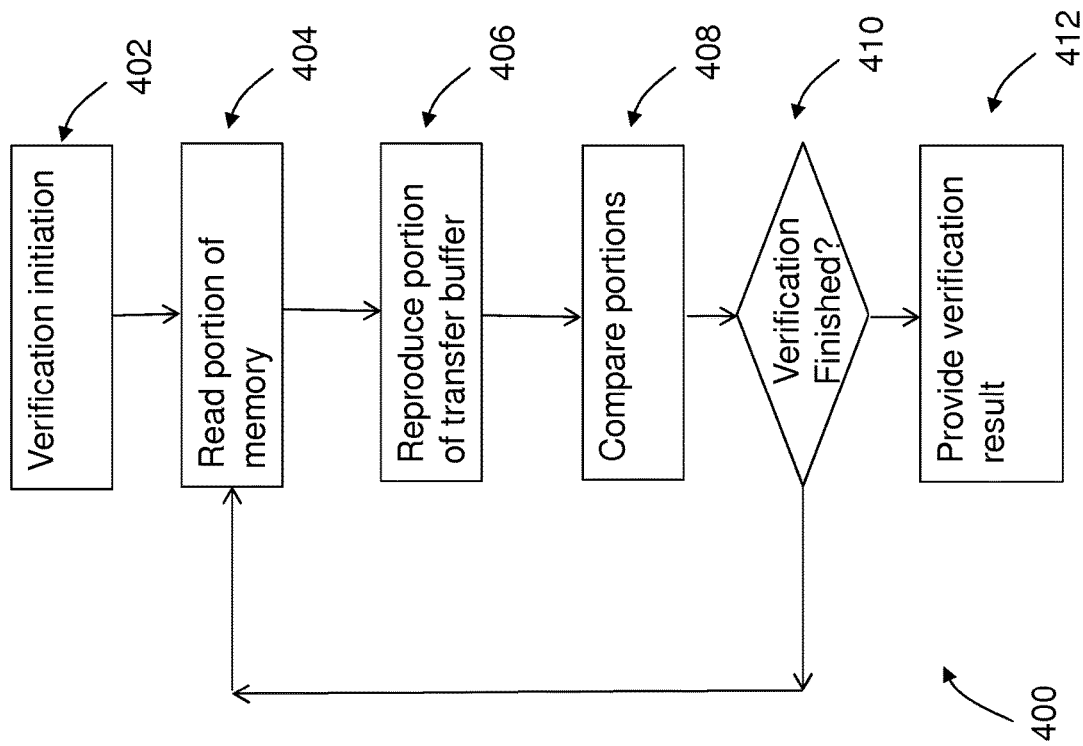
FIG. 4 is a flow chart of a data verification method.

FIG. 4 shows a verification process 400 that can be implemented following completion of the method 100 of FIG. 1. Verification process 400 requires that reference indices of the generated files during step 104 are stored as described above and the process also requires access to the transfer buffer or random seed used to generate the transfer buffer. Together, the stored reference indices of created files and stored random seeds allow all created files to be re-produced without reference to the actual transfer buffer. Advantageously, this reduces the amount of data that needs to be stored for a verification process as the transfer buffer itself does not need to be stored.

At step 404 a request is sent to the data storage device 10 to retrieve a check portion of the memory 12. The request includes a check portion identifier. The request is sent from the data erasure apparatus 20 over the interface 30. Using the check portion identifier, the processor 18 via firmware 14 locates and retrieves the check portion of the memory. The contents of the check portion are returned over the interface 30 to the data erasure apparatus 20 to be verified.

Step 404 may be implemented at the file level or at a direct access to physical memory level. If operating at the file level, the check portion identifier can be a file name or other suitable file identifier and the request may be sent using the file-based transfer protocol. The processor 18 then retrieves the file and returns the file over the file-based transfer protocol to the data erasure apparatus.

Alternatively, using direct access to memory the check portion identifier may comprise a value corresponding to the start point of the check portion in the physical memory and a check portion size. The check portion size value may be a constant size or may be variable, for example, each check portion start point may have an associated check portion size. Processor 18 via firmware 14 locates the check portion start point and copies the contents of the memory 12 starting at the check portion size with size equal to the check portion size value. The contents are returned over the interface 30 to the data erasure apparatus 20.

The verification process may be a partial verification process where only a sub-set of the contents of memory 12 is verified. In this case a collection of check portion identifiers are generated. The collection of check portion identifiers may be generated randomly. For a full verification, all contents of accessible memory 12 must be verified. In this case, the collection of check portion identifiers must be chosen such that the retrieved check portions span the entire memory 12. In the file-based implementation all files must be retrieved. In the direct access implantation, the check portion start points and check portion lengths must be chosen to span the entire contents of the memory.

At step 406, a portion of the transfer buffer file corresponding to the retrieved check portion is re-produced using stored reference indices. This may be implemented in different ways.

In the file-based transfer implementation, the stored reference index corresponding to the file identifier can be retrieved. Using the reference index, the relevant portion of the transfer buffer can be selected and retrieved.

In a direct memory access implementation, the relevant portion is retrieved using the check portion start point, check portion start length and reference indices.

The re-produced portion can be generated from the entire transfer buffer or from parts of the transfer buffer. For example, if the transfer buffer has been retained in memory following the method 100 then the relevant part of the transfer buffer can be re-produced using stored reference indices. Alternatively, if the transfer buffer is not retained in memory 24 of the data erasure apparatus 20 following the method 100, a copy can be recreated in memory 24 using the stored random seed and the relevant part of the transfer buffer can be looked up using the check portion start point.

At step 408, the contents of the retrieved check portion and the contents of the re-produced portion are compared. A successful comparison corresponds to equal contents of both portions and the result of the comparison is stored. If the contents of the check portion do not match the contents of the corresponding re-produced portion then a non-overwritten area of memory 12 has been found.

Step 410 determines whether or not comparisons of further portions are to be made based on whether or not there are further check portions to be examined. If further comparisons are to be made, the method returns to step 404 where a subsequent check portion is read. If no further portions need to be compared, the process continues to step 412. In one implementation, following an unsuccessful comparison at step 408, it may be decided that no further comparisons of check portions are to be made and the process proceeds to step 412.

Step 412 examines the stored results of the comparisons. If all comparisons have been successful then no non-overwritten areas of memory 12 have been found corresponding to a positive result of the verification process. If at least one comparison is not successful then at least one non-overwritten are of memory 12 has been found corresponding to a negative result of the verification process.

The verification process of FIG. 4 may be implemented in a processing environment where not every device that is overwritten is verified. In such an environment, the erasure process can have a high throughput. The verification process provides an approach to verify devices without the associated storage requirements to store each transfer buffer for each device, as only the seeds needs to be stored. The random data of the file buffer does not need to be stored and the host can recreate the random data on demand. Additionally, reference indices are stored. Verification may be faster using stored reference indices that comparing all of the contents of the target memory. The capability of being able to reproduce the transfer buffer later also allows verification to be performed at a different physical location to the erasure station.

In a processing environment, the verification process of FIG. 4 can be implemented immediately following the overwriting process. In an alternative implementation, devices are chosen at random and verified away from the main production line.

An example implementation of process 400 is set out with reference to erasing a memory of 64 GB on a device. The file transfer buffer needs to be at least 10 Mb+6400 bytes to provide a unique set of transferred files. Following an overwriting procedure a partial verification process can be implemented with 100 randomly chosen check portion start points and, for example, a 1 kB check length. 100 check portions, each with a size of 1 kB are thereby retrieved by the data erasure apparatus from the 64 GB memory. Using a stored seed, a copy of the file transfer buffer can be generated and using the stored reference indices the portions of the transfer buffer that were correspond to the 100 check portions can be re-produced. This collection of 100 re-produced portions is compared to the 100 retrieved check portions to verify that the transfer process has been successful.

A skilled person will appreciate that variations of the enclosed arrangement are possible without departing from the invention. For example, while the created files and transfer buffer are described as being populated with randomised data, alternative data patterns can be generated and used to write files and/or the transfer buffer. Such alternative data patterns include repeating byte patterns, such as 0xFF or 0x00. In addition, steps of the verification process may be implemented during the overwriting process. As non-limiting example, a written file may be verified immediately after being written and/or at any time before the memory reports that it is full. Accordingly, the above description of the specific embodiment is made by way of example only and not for the purposes of limitations. It will be clear to the skilled person that minor modifications may be made without significant changes to the operation described.

What is claimed is:

1. A method of erasing data using a file-based protocol from a data storage apparatus for repurposing, reallocation to a new user or retirement of the data storage apparatus, the data storage apparatus comprising a memory, and the method comprising:

receiving one or more signals representative of the available free space of at least one selected region of the memory;

iteratively writing files to the at least one selected region of the memory using the file based protocol, wherein at least one of the files is sized based on at least one of the received signals, wherein the iterative writing of the files comprises writing the files in sequence such that for at least part of the sequence each file is smaller in size than the preceding file of the sequence, and wherein the files are written to collectively occupy all of the at least one selected region of the memory;

receiving an indication that said at least one selected region of memory is full following the writing of said files; and in response to the indication, writing at least one further file to said at least one region of memory.

2. The method according to claim 1, wherein the selected at least one region comprises the user partition of the memory and/or substantially all of the memory not reserved for an operating system and/or firmware of the apparatus.

3. The method according to claim 1, further comprising performing a verification procedure comprising:

reading data from at least one portion of the selected region of memory;

using a stored index or indices to select at least one sub-set of a data set used for generation of the files written to the memory, said at least one sub-set corresponding to said at least one portion;

comparing the read data with the corresponding at least one sub-set of data.

4. The method according to claim 3, wherein the data used for generation of the files written to the memory is generated using a seed, and the verification procedure comprises regenerating at least part of the data set using the seed.

5. The method according to claim 4, wherein the verification procedure comprises using said stored indices and said seed to regenerate the sub-sets of the data-set without generating the whole of the data set used for generation of the files written to memory.

6. The method according to claim 1, wherein each of the files comprises randomly generated data.

7. The method according to claim 1, wherein iteratively writing files further comprises reducing in size one or more of the iteratively written files based on the received one or more signals.

8. The method according to claim 1, wherein the received one or more signals are generated in response to a request for available free space, and each of the received signals comprise a respective value representative of an amount of available free space.

9. The method according to claim 1, comprising performing an initial erasure and/or freeing procedure to erase data from the selected at least one region of memory and/or to free up the selected at least one region to receive files, prior to the iterative writing of the files.

10. The method according to claim 1, comprising generating the files.

11. The method according to claim 10, wherein generating the files comprises selecting a plurality of sub-sets of a data set and, for each of the files, generating the file to comprise a selected one of the plurality of sub-sets.

12. The method according to claim 11, comprising storing indices representative of the parts of the data set of which the sub-sets consist.

13. The method according to claim 12, wherein the data set comprises a randomly generated data set and the sub-sets comprise selected parts of the randomly generated data set.

14. The method according to claim 1, comprising generating the data set and/or the files using at least one seed, and storing the at least one seed.

15. The method according to claim 1, wherein the verification procedure is to verify that the files have been written to the memory correctly and/or to verify that substantially all of the selected at least one region of memory has been occupied.

16. The method according to claim 15, further comprising retrieving or regenerating the data that was included in the files written to the memory.

17. The method according to claim 1, further comprises, in response to said indication that said at least one region of memory is full, freeing up at least some of said at least one region of memory.

18. The method according to claim 17, wherein the freeing up and the writing of the further files is repeated more than once.

19. The method according to claim 1, wherein at least one of:

the data storage apparatus comprises at least one of a phone, a smartphone, a tablet, a laptop computer, a desktop computer, a portable electronic device, a music device, a video device, an iOS device, an Android device, a Windows device and a Blackberry device;

the memory comprises at least one of a Self-encrypting Drive (SED), a Hard Disk Drive (HDD), a Solid State Drive (SSD), Non-Volatile Memory, flash memory, NAND flash memory or Random Access Memory (RAM); and the method comprises providing the files to the apparatus and/or the memory via an interface, and the interface operates according to, or is compliant with, at least one of Serial AT Attachment (SATA), Parallel ATA (PATA), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe), Universal Flash Storage (UFS), MultiMediaCard (MMC) and MMC variants including RS-MMC, MD-MMC, DV-MMC, MMCplus, MMCmobile, SecureMMC, eMMC, and Secure Digital and Secure Digital variants including SDIO, SD, miniSD, microSD.

20. The method according to claim 1, wherein each of the files is of size between a maximum file size and a minimum file size, and at least one of a) or b):

a) the maximum file size is in a range between 1 MB and 100 MB, optionally between 5 MB and 20 MB, optionally substantially equal to 10 MB;

b) the minimum file size is less than 100 bytes, optionally less than 10 bytes, optionally 3 bytes, 2 bytes or 1 byte.

21. The method according to claim 1, wherein each of the files is of size between a maximum file size and a minimum file size and the method comprises selecting the maximum file size and/or the minimum file size in dependence on at least one of the nature or identity of the apparatus and/or the memory, and/or the nature or identity of an operating system of the apparatus and/or the memory, and/or the size of the memory or the selected at least one region of the memory.

22. An article of manufacture including a non-transitory, tangible computer readable storage medium having instructions stored thereon that, in response to execution by a computer-based system, cause the computer-based system to perform operations comprising:

receiving one or more signals representative of the available free space of at least one selected region of the memory;

iteratively writing files to the at least one selected region of the memory using the file based protocol, wherein at least one of the files is sized based on at least one of the received signals, wherein the iterative writing of the files comprises writing the files in sequence such that for at least part of the sequence each file is smaller in size than the preceding file of the sequence, and wherein the files are written to collectively occupy all of the at least one selected region of the memory, receiving an indication that said at least one selected region of memory is full following the writing of said files; and in response to the indication, writing at least one further file to said at least one region of memory.

23. A data erasure apparatus configured to erase data from a data storage apparatus comprising a memory using a file-based protocol, the data erasure apparatus comprising a processing resource configured to:

receive one or more signals representative of the available free space of at least one selected region of the memory;
    iteratively write files to the at least one selected region of the memory using the file based protocol,
wherein at least one of the files is sized based on at least one of the received signals,
wherein the iterative writing of the files comprises writing the files in sequence such that for at least part of the sequence each file is smaller in size than the preceding file of the sequence, and
    wherein the files are written to collectively occupy all of the at least one selected region of the memory;
receive an indication that said at least one selected region of memory is full following the writing of said files; and
in response to the indication, write at least one further file to said at least one region of memory.

24. A system for erasing data from a data storage apparatus comprising a memory using a file-based protocol, the system comprising:
    the data storage apparatus; and
    a data erasure apparatus configured to erase data from a data storage apparatus comprising a memory using a file-based protocol,
    the data erasure apparatus comprising a processing resource configured to:
        receive one or more signals representative of the available free space of at least one selected region of the memory;
        iteratively write files to the at least one selected region of the memory using the file based protocol,
        wherein at least one of the files is sized based on at least one of the received signals,
        wherein the iterative writing of the files comprises writing the files in sequence such that for at least part of the sequence each file is smaller in size than the preceding file of the sequence, and
        wherein the files are written to collectively occupy all of the at least one selected region of the memory;
        receive an indication that said at least one selected region of memory is full following the writing of said files; and
        in response to the indication, write at least one further file to said at least one region of memory.

25. A non-transitory machine-readable storage medium having a computer program comprising computer-readable instructions that are executable to perform a method of erasing data using a file-based protocol from a data storage apparatus for repurposing, reallocation to a new user or retirement of the data storage apparatus, the data storage apparatus comprising a memory, and the method comprising:
    receiving one or more signals representative of the available free space of at least one selected region of the memory;
    iteratively writing files to the at least one selected region of the memory using the file based protocol,
        wherein at least one of the files is sized based on at least one of the received signals,
        wherein the iterative writing of the files comprises writing the files in sequence such that for at least part of the sequence each file is smaller in size than the preceding file of the sequence,
        wherein the files are written to collectively occupy all of the at least one selected region of the memory;
    receiving an indication that said at least one selected region of memory is full following the writing of said files; and
    in response to the indication, writing at least one further file to said at least one region of memory.

* * * * *